UNITED STATES PATENT OFFICE.

FORÉE BAIN, OF CHICAGO, ILLINOIS.

ELECTRODE FOR SECONDARY BATTERIES.

SPECIFICATION forming part of Letters Patent No. 444,969, dated January 20, 1891.

Application filed October 17, 1890. Serial No. 368,385. (No model.)

*To all whom it may concern:*

Be it known that I, FORÉE BAIN, a citizen of the United States, residing at Chicago, in the county of Cook and State of Illinois, have invented a new and useful Improvement in Secondary Electric Batteries, of which the following is a specification.

My invention relates to an improvement in the class of secondary or so-called "storage" batteries, in which each element comprises active material affording the peroxide contained in a pocket of a suitable form and of metal (lead) provided throughout its body with numerous perforations.

The objects of the form of secondary-battery element thus outlined are to present to the action of the electrolyte a comparatively great extent of surface of the active material and to reduce the bulk and weight of the battery to the minimum consistent with durability, and further objects are to avoid the objectionable qualities of the "grid" form of secondary-battery element employed to support the active material, and which consist in the tendency thereof, owing to its constant expansion and contraction, to loosen the active material with which it is provided and permit the same to drop from its support and lodge at the bottom of the cell, thereby short-circuiting, and, furthermore, in the comparatively small extent of surface (only the outside) of the active material presented to the action of the electrolyte.

The objects of my improvement are to provide a construction of secondary-battery element which shall render the battery substantial, enable it to withstand rough usage, and afford to it increased efficiency and activity. These objects I accomplish by the construction of secondary-battery element illustrated in the accompanying drawing by a broken perspective view.

While the manner described of providing the materials $p$ and $n$ in alternating strata within the envelope A is preferred, the two (No Model.)
F. BAIN.
ELECTRODE FOR SECONDARY BATTERIES.
No. 444,969. Patented Jan. 20, 1891.
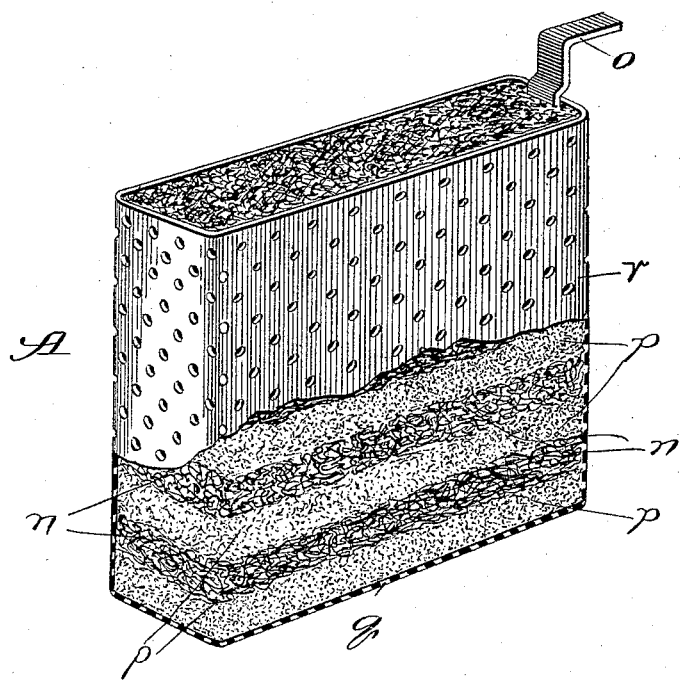

To produce my improved element I construct a pocket A, preferably of the flat-sided or substantially rectangular form shown, and composed of a suitable metal, preferably sheet-lead or lead cloth, the pocket being provided throughout its body portion $r$ and base $q$ with numerous perforations, and the top being open, (to be covered, if desired, after the pocket has been filled, as hereinafter described.) Into this pocket I first introduce the active material $p$, preferably as a dry finely-divided or powered oxide of lead (peroxide, minium, red lead, or other suitable material) in a quantity sufficient to produce a stratum of desired depth—say one-half an inch. Upon this I introduce a suitable porous well-conducting material $n$, preferably coke or other form of carbon, and in granulated condition, in sufficient quantity to form a stratum like that of the material $p$ below it. These strata $p$ and $n$ alternate with each other in the pocket and should fill the latter. I prefer to incorporate with the active material $p$ a proper quantity (say about two per cent.) of bisulphate of mercury to effect amalgamation of the lead pocket and produce the better contact between the porous strata and the lead walls of the pocket. The purpose of the porous material $n$ is to allow free access of the electrolyte on entering the pocket or envelope A through its perforations to a large extent of active material and to act as a good conductor between the active material $p$ and the walls of the pocket, thereby entailing a very low internal resistance and rendering available practically all of the active material contained in the envelope A. Since lead expands or stretches under the influence of chemical action and that of heat, but does not on the removal of such influence contract in the same degree, I prefer to use as the metal for the pocket A an alloy of lead, preferably type-metal, which I have found to answer my purpose as well as lead without having the objectionable quality stated of the latter. If the intimate contact be maintained between the active material $p$ and the lead support A, there will be no excessive sulphating, and the internal resistance is not increased with the charging of the battery or while the latter is being worked nearly up to its maximum load. After the pockets A in desired number for a battery have been filled as described I place them at once in their containing cell and charge or "form" them, when they are ready for shipment.